United States Patent [19]

Schambre et al.

[11] Patent Number: 6,082,800
[45] Date of Patent: Jul. 4, 2000

[54] CARGO LOAD SUPPORT SYSTEM

[75] Inventors: John Schambre, Canton; Michael D. Tesauro, Wixom; David L. Garber, Canton; Joseph J. Alongi, New Baltimore, all of Mich.

[73] Assignee: DaimlerChrysler Corporation, Auburn Hills, Mich.

[21] Appl. No.: 09/342,291

[22] Filed: Jun. 29, 1999

[51] Int. Cl.$^7$ .................................................. B62D 33/00
[52] U.S. Cl. .......................... 296/26.09; 296/106; 296/50
[58] Field of Search ........................... 296/50, 106, 57.1, 296/39.1, 39.2, 26.08, 26.09

[56] References Cited

U.S. PATENT DOCUMENTS

| | | |
|---|---|---|
| 1,366,771 | 1/1921 | Devencenzi . |
| 1,730,480 | 10/1929 | Shirreff . |
| 2,729,499 | 1/1956 | Eggum . |
| 2,784,027 | 3/1957 | Temp . |
| 2,852,303 | 9/1958 | Hopson . |
| 4,475,760 | 10/1984 | Morgan . |
| 4,733,898 | 3/1988 | Williams ................................ 296/37.6 |
| 4,950,123 | 8/1990 | Brockhaus . |
| 4,951,991 | 8/1990 | Haigler . |
| 5,152,570 | 10/1992 | Hood ............................................. 296/3 |
| 5,509,709 | 4/1996 | Carroll ..................................... 296/100 |
| 5,564,767 | 10/1996 | Strepek ...................................... 296/26 |
| 5,700,047 | 12/1997 | Letner et al. ........................... 296/37.6 |
| 5,820,188 | 10/1998 | Nash ........................................... 296/26 |
| 5,924,753 | 7/1999 | DiBassie .............................. 296/26.09 |
| 5,938,262 | 8/1999 | Mills .................................... 296/26.09 |

*Primary Examiner*—Dennis H. Pedder
*Assistant Examiner*—Mickki D. Murray
*Attorney, Agent, or Firm*—James R. Yee

[57] ABSTRACT

A cargo load support system for a motor vehicle having a bed defined by a pair of sidewalls and a swing gate includes a guide mechanism having a plurality of guide apertures. The guide mechanism is adapted for attachment to the bed. The cargo load support system further includes a rail assembly translatable from a stowed position to an operable position. The rail assembly has a plurality of parallel rails and an orthogonally oriented end rail interconnecting the plurality of parallel rails. The parallel rails are slidingly engaged with the guide apertures. The guide mechanism is adapted for attachment to the motor vehicle. The rail assembly is adapted to be detachably coupled to the swing panel when the rail assembly is in the operable position.

20 Claims, 4 Drawing Sheets

CARGO LOAD SUPPORT SYSTEM

BACKGROUND OF THE INVENTION

1. Technical Field

The present invention generally relates to motor vehicles. More particularly, the present invention pertains to an arrangement for extending the bed of a cargo-carrying vehicle equipped with a tailgate.

2. Discussion

Owners of cargo-carrying vehicles including but not limited to pickup trucks and sport utility vehicles often have a need to temporarily increase the amount of cargo space available to them. For example, a vehicle owner attempting to haul a standard four foot by eight foot sheet of plywood or drywall may have to seek other means of transportation or strap the cargo to the top of the vehicle. Unfortunately, some would be owners of smaller cargo carrying vehicles may purchase a larger vehicle simply to accommodate the few times a larger cargo area is required. Accordingly, such an owner would benefit from a device capable of temporarily increasing the cargo area of a vehicle.

Hauling cargo on the top of a vehicle presents a variety of problems. In the case of a vehicle with a soft top, it is impractical to attempt to use the top bow structure to support the weight of building materials. In other cases, the cargo is simply too long in relation to the vehicle length to safely secure it to the top of the vehicle. Accordingly, transporting this type of cargo creates the further difficulty of a possible safety hazard when the cargo leaves the hauling vehicle and enters the road. Lastly, if the vehicle is equipped with a hard top, many owners do not wish to risk damage to the exterior finish of the top in order to haul certain cargo.

Existing structures such as the arrangement disclosed in U.S. Pat. No. 4,472,639 entitled "Tailgate Attachment for Extending the Cargo Space of Vehicles" have been designed for the purpose of increasing the cargo space of trucks and other vehicles. However, these devices have certain disadvantages. In some cases, unwieldy structures are temporarily installed into the bed of the vehicle only having to be removed and stored in a separate location when not in use. In other cases, the device interferes with normal day-to-day use of the vehicle when a bed extender is not required. In still other cases, the device relies on a vehicle tailgate opening parallel to the ground to provide support for the cargo to be hauled.

SUMMARY OF THE INVENTION

It is therefore an object of the present invention to provide a cargo load support system integrally packaged within the box of a cargo-carrying vehicle.

It is another object of the present invention to provide a cargo load support system for use in new or currently used vehicles.

It is yet another object of the present invention to minimize interference with the type of use where a cargo load support system is not required.

It is a more particular object of the present invention to provide a cargo load support system for a motor vehicle stowable beneath a bed liner.

According to the present invention, a cargo load support system for a motor vehicle includes a bed defined by a pair of sidewalls and a swing gate includes a guide mechanism having a plurality of guide apertures. The guide mechanism is adapted for attachment to the bed. The cargo load support system further includes a rail assembly translatable from a stowed position to an operable position. The rail assembly has a plurality of parallel rails and an orthogonally oriented end rail interconnecting the plurality of parallel rails. The parallel rails are slidingly engaged with the guide apertures. The guide mechanism is adapted for attachment to the motor vehicle. The rail assembly is adapted to be detachably coupled to the swing panel when the rail assembly is in the operable position.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
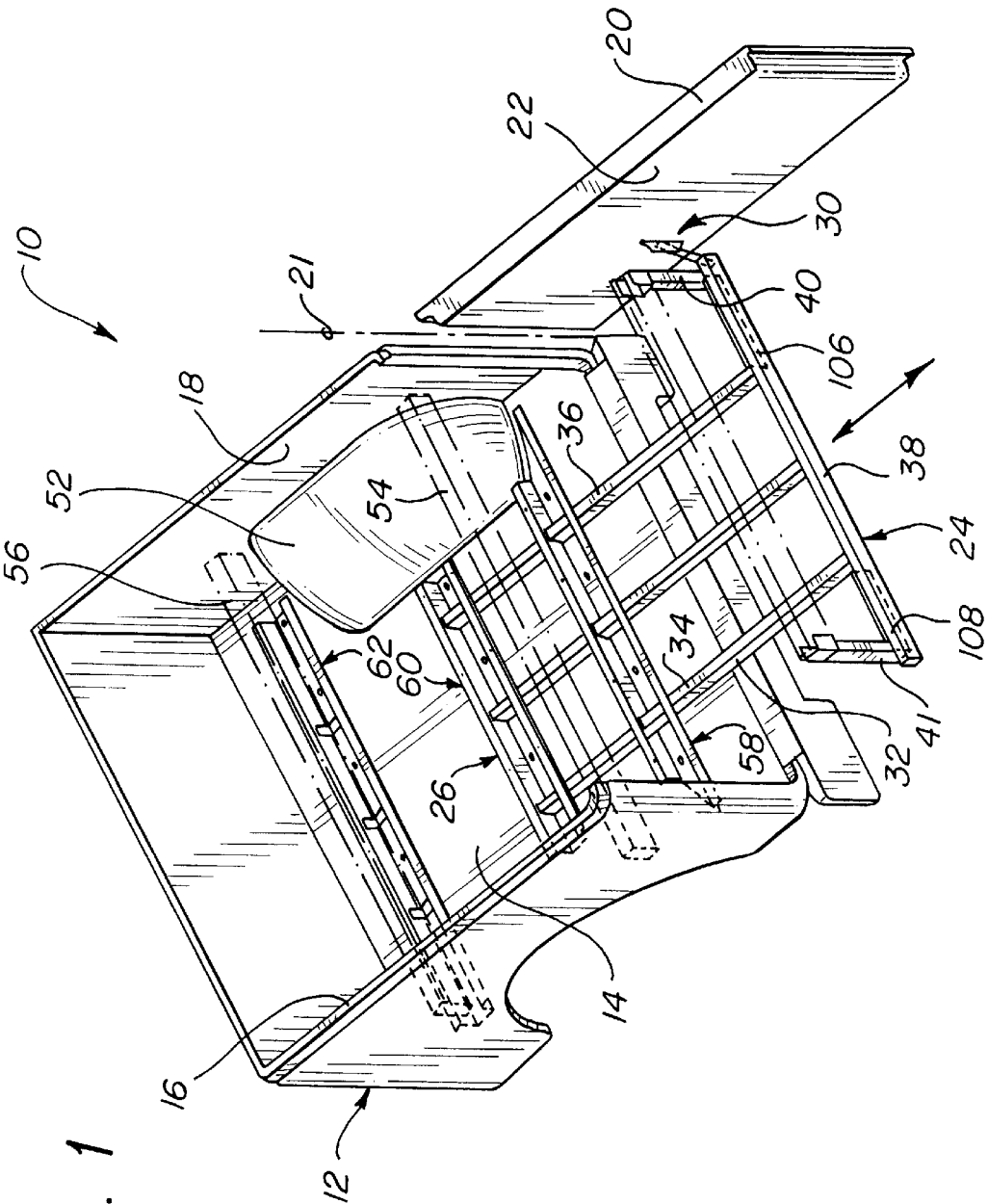
FIG. 1 is a perspective view of a portion of a motor vehicle illustrating the cargo load support system of the present invention in an operable position.

With reference to the drawings, a cargo load support system constructed in accordance with the teachings of an embodiment of the present invention is generally identified at reference numeral 10. The cargo load support system 10 is shown operatively associated with an exemplary motor vehicle 12. In the exemplary embodiment, the vehicle 12 includes a bed 14, a first sidewall 16, a second sidewall 18, and a swing gate 20 which can be pivoted about an axis 21 from a closed position to an open position. When the cargo load support system 10 is in the operable position shown in FIG. 1, the swing gate 20 is in a partially opened position with an inner surface 22 substantially coplanar with second sidewall 18.

Figure 2:
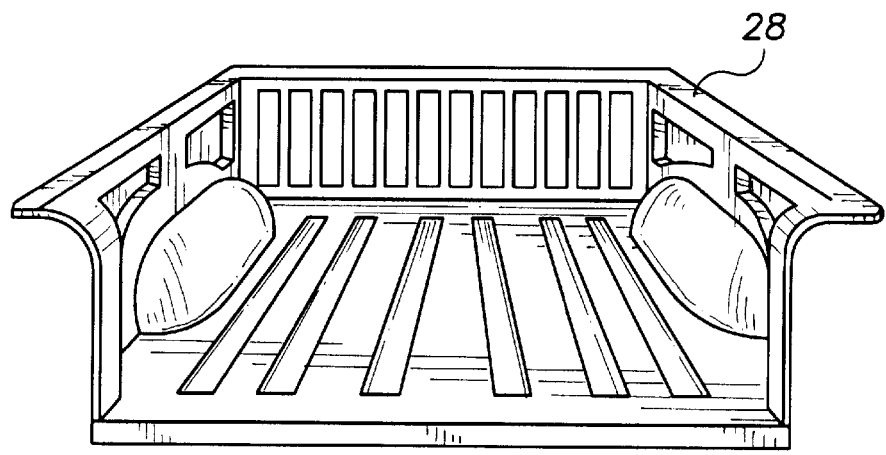
FIG. 2 is a perspective view of the bed liner of the present invention.

As best shown in FIGS. 1 and 2, the cargo load support system 10 is illustrated to generally include a rail assembly 24, a guide mechanism 26, a bed liner 28 and a gate lock mechanism 30 for interconnecting the swing gate 20 with the rail assembly 24. For purposes of illustration, FIG. 1 depicts cargo load support system 10 without the bed liner 28 shown.

With specific reference to FIG. 1, the rail assembly 24 comprises a first rail 32 positioned in parallel relation to a second rail 34 and a third rail 36. The rail assembly 24 further includes an end rail 38 and two load supports 40 and 41. The end rail 38 interconnects the first rail 32, the second rail 34 and the third rail 36 by orthogonally capping each of the respective parallel rails. One skilled in the art will appreciate that while the rails shown in the figures appear to be rectangular beams, the rails may be constructed from a variety of solid or tubular products having cross sections of virtually any shape including a circle, a square or an I-beam.

Figure 3:
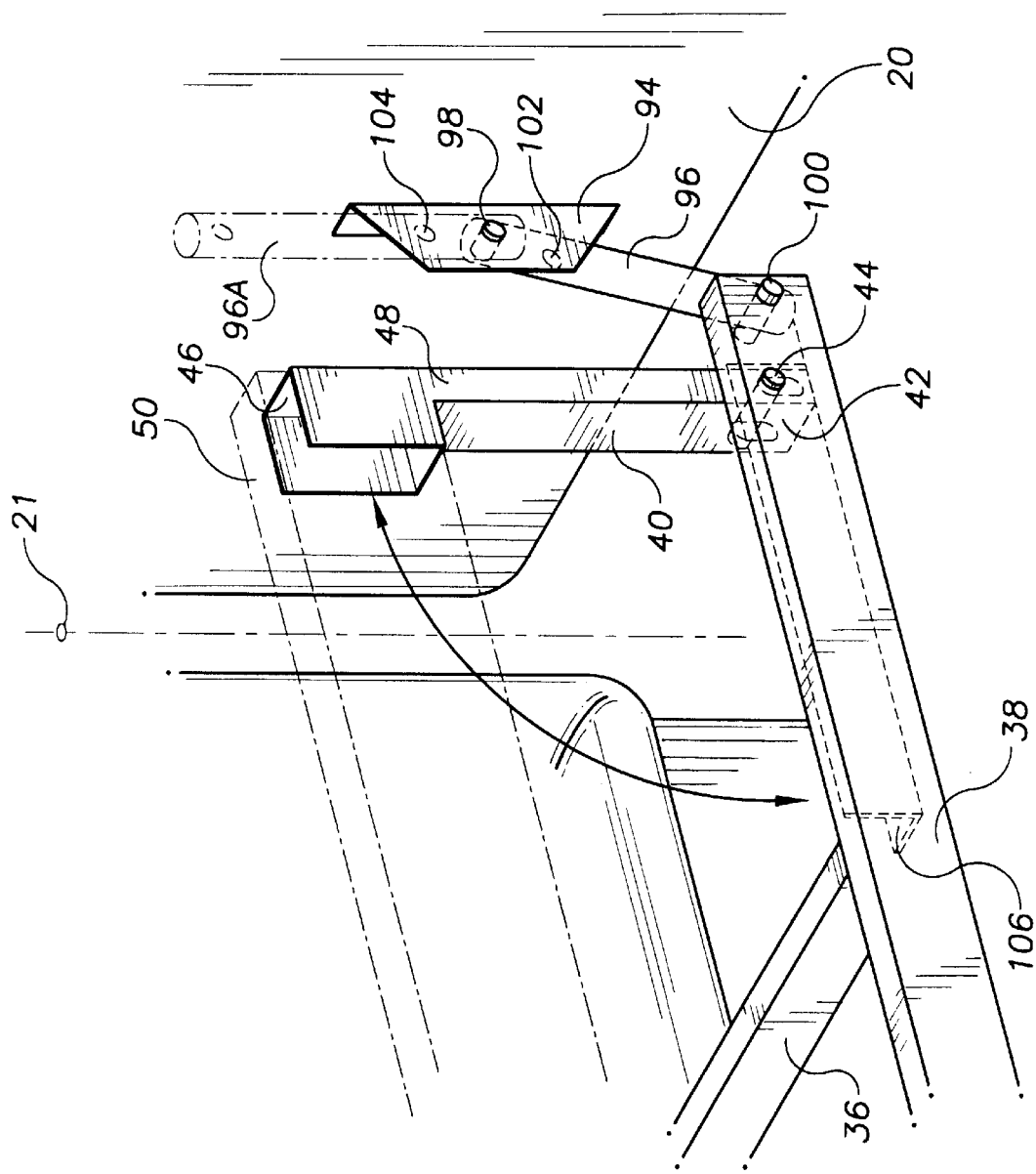
FIG. 3 is an enlarged perspective view further illustrating the cargo load support system in an operable position.

As particularly shown in FIGS. 1 and 3, the load support arms or load supports 40 and 41 are substantial mirror images of one another. For clarity, the load support 40 will be described in detail. The load support 40 includes a first end 42 pivotally attached to the end rail 38 via a rail pin 44. The load support 40 further includes a "C" shaped channel 46 integrally formed at a second end 48 opposite the first end 42. The load support 40 is shown in an upright, operable position for receipt of a secondary floor member 50. The channel 46 is sized to accept a standard 2×4 inch lumber stud as the secondary floor member 50. In order to maximize the area of the secondary floor, the load support 40 is of a length to position the secondary floor member 50 at a plane above vehicle wheel wells 52. To complete the secondary floor plane and provide further support for large cargo such as 4×8 foot sheets, additional floor members 54 and 56 are positioned within sidewall mounts not specifically shown. One skilled in the art will appreciate that the sidewall mounts may be integrally formed within the sidewalls 16 and 18 or may simply be brackets mounted to the sidewalls after the vehicle has been purchased.

With specific reference to FIG. 1, the cargo load support system 10 also includes a guide mechanism 26 for aligning and supporting the rail assembly 24. Specifically, the guide mechanism 26 includes a first brace 58, a second brace 60 and a third brace 62 coupled to the bed liner 28 (FIG. 2). Each of the braces 58–62 are substantially identical except in length. Accordingly, only the first brace 58 will be described in detail.

Figure 4:
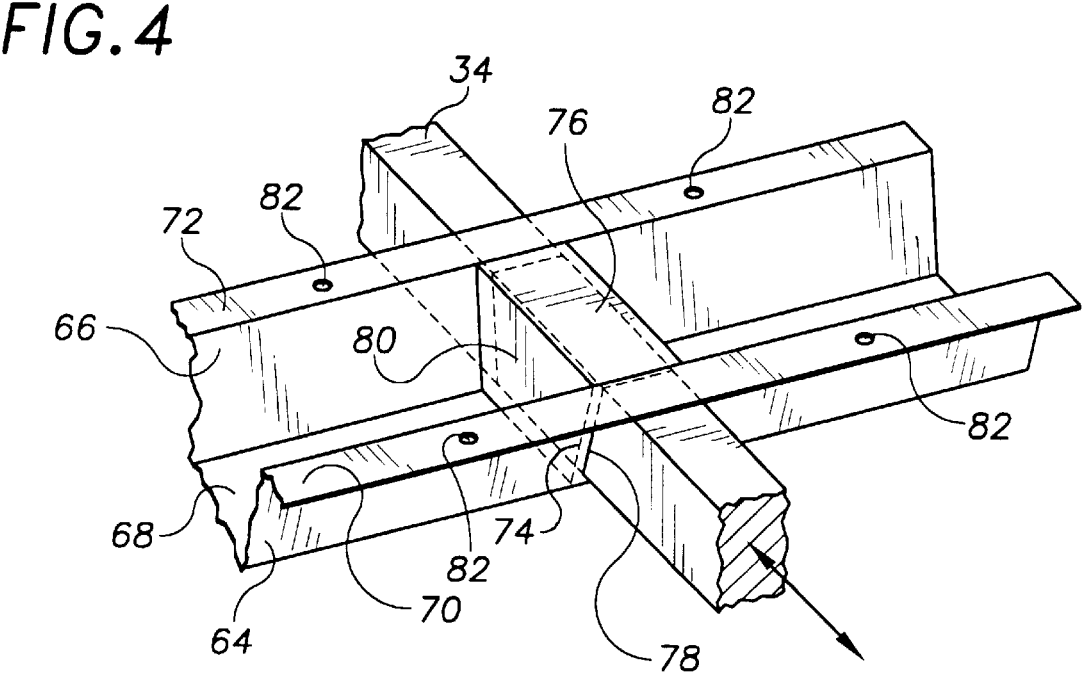
FIG. 4 is an enlarged perspective view illustrating a portion of the cargo load support system of the present invention.

As shown in FIG. 4, the first brace 58 is a generally "hat" shaped channel bounded on three sides having opposing walls 64 and 66 and a top 68. The "hat" shaped cross section is completed by flanges 70 and 72 laterally extending from the opposing walls 64 and 66, respectively. The first brace 58 includes a plurality of bushing apertures 74 extending through the opposing walls 64 and 66. The brace 58 further includes bushings 76 disposed within the bushing apertures 74 for support of the rails 32, 34, and 36. More particularly, the bushings 76 are preferably formed of a lightweight plastic material having a low coefficient of friction. The bushings 76 include an inner passage 78 shaped to substantially complement the outer surface of rails 32, 34, and 36 and an outer surface 80 shaped to compliment the bushing apertures 74 formed in brace 58. One skilled in the art will appreciate that the plastic bushings 76 are merely exemplary and that a variety of other devices including bearings or sleeves may be used without departing from the scope of the invention presented.

Figure 5:
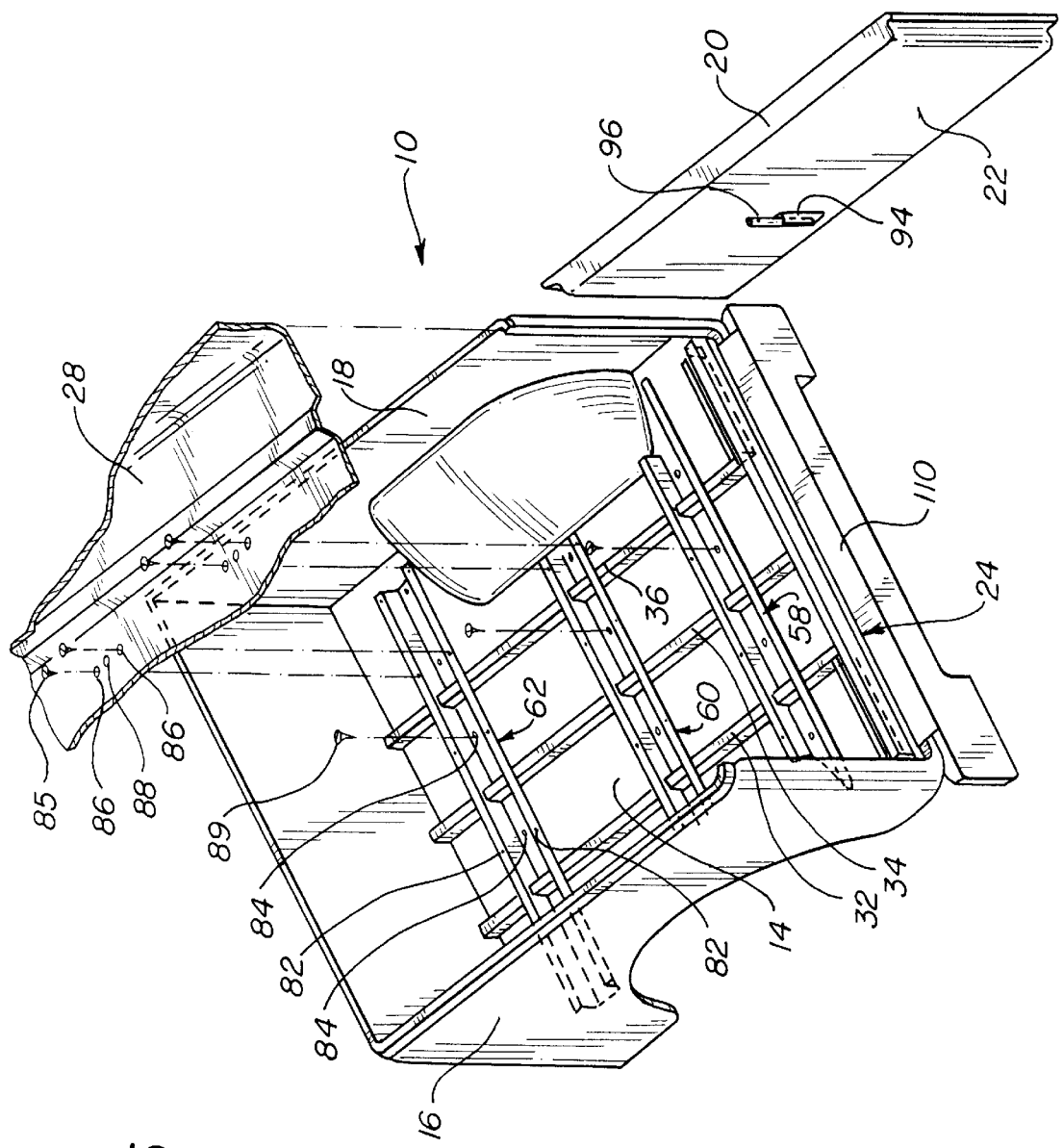
FIG. 5 is another perspective view similar to FIG. 1, illustrating the cargo load support system in a stowed position.

Referring to FIGS. 4 and 5, the brace 58 also includes two sets of fastener apertures 82 and 84 to facilitate the interconnection of the bed liner 28 and the truck bed 14. The fastener apertures 82 are located in the flange sections 70 and 72 of brace 58 and align with a set of fastener apertures 86 located in the bed liner 28. Standard threaded fasteners 85 are used to couple the bed liner 28 to each of the braces 58, 60 and 62.

In order to be able to retrofit existing vehicles with the cargo load support system 10 of the present invention, the bed liner 28 is further equipped with another set of fastener apertures 88. The fastener apertures 88 are large enough to accommodate entry of a typical socket for applying torque to a threaded fastener. The cargo load support system 10 is mounted to the vehicle 12 by disposing fasteners 89 through the bed liner apertures 88 and the brace apertures 84 located in the top section 68. Once the cargo load support system 10 has been secured to the vehicle 12, plugs (not shown) are inserted into the apertures to provide resistance to contaminant ingress and also provide an aesthetically pleasing appearance.

Referring to FIG. 1, the cargo load support system 10 is shown in an operable position. As such, when the swing gate 20 is opened at least ninety degrees from its closed position, the rail assembly 24 may be extended approximately two feet to its operable position. At this time, the gate lock mechanism 30 interconnects swing gate 20 to rail assembly 24. As specifically shown in FIG. 3, the gate lock mechanism 30 comprises a gate bracket 94, a lock bar 96, a pivot pin 98, a first lock pin 100 and a second lock pin 102. As shown in FIG. 3, the lock bar 96 in rotatably interconnected to the gate bracket 94 via the pivot pin 98. In the operable position, the lock bar 96 is coupled to the end rail 38 via the first lock pin 100. In addition, the lock bar 96 is secured to the gate bracket 94 at a second location by second lock pin 102 to reduce the tendency of swing gate 20 to rotate about the pivot axis 21. At this time cargo load support system 10 is in the operable position. If a secondary load floor is desired, the load supports 40 and 41 may be rotated from a stored position generally parallel to bed 14 to an operable position ninety degrees thereto. As noted earlier, the secondary floor members 50, 54, and 56, commonly known as 2×4s, may be installed to create a secondary floor capable of hauling 4×8 foot sheets as shown in FIG. 1.

To place the cargo load support system 10 in the stowed position, first and second lock pins 100 and 102 are removed from their fastening locations previously described. The lock bar 96 is shown in a stowed position at 96A in FIG. 3. The lock bar 96 is stowed by rotating the lock bar 96 about the pivot pin 98 and inserting the first lock pin 100 through an upper aperture 104 in the gate bracket 94. The supports 40 and 41 are rotated to a generally horizontal position resting flush against the shelves 106 and 108 as shown in FIG. 3. The rail assembly 24 is then retracted under bed liner 28 and stowed as shown in FIG. 5. One skilled in the art will appreciate that once the rail assembly 24 is in the stowed position, the motor vehicle 12 may be utilized as if there were no cargo load support system present. Specifically, the rail assembly 24 retracts to a position where the swing gate 20 is free to rotate to its fully closed position without interference from any cargo load support system component. Of special importance is the available land 110 within the bed 14 that provides a seat for a weather seal located on swing gate 20.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A cargo load support system for a motor vehicle having a bed defined by a pair of sidewalls and a swing gate articulable about a vertical axis, the cargo load support system comprising:

a guide mechanism including a brace having a plurality of guide apertures, said brace for attachment to the bed; and a rail assembly translatable from a stowed position to an operable position, the rail assembly having a plurality of parallel rails and an orthogonally oriented end rail interconnecting said plurality of parallel rails, the parallel rails slidingly engaged with the guide apertures and orthogonally oriented relative to the brace, the rail assembly for detachable coupling to the swing gate by a lock mechanism when the rail assembly is in the operable position.

2. The cargo load support system for a motor vehicle of claim 1, further including a bed liner coupled to said guide mechanism.

3. The cargo load support system for a motor vehicle of claim 2, wherein said bed liner is adapted to be spaced apart from the motor vehicle bed to define a pocket for said rail assembly to store when said rail assembly is in the stowed position.

4. The cargo load support system for a motor vehicle of claim 1, further including a support pivotally interconnected to said rail assembly, the support being articulable from a stowed position generally parallel to said end rail to an operable position generally perpendicular to said end rail.

5. The cargo load support system for a motor vehicle of claim 4, wherein said support provides a receptacle for a secondary floor member generally parallel to the bed.

6. The cargo load support system for a motor vehicle of claim 2, wherein said rail assembly is entirely below the bed liner when in said stowed position.

7. A cargo load support system in combination with a vehicle having first and second spaced apart sidewalls, a bed and a swing gate articulable from an open position to a closed position, the cargo load support system comprising:
   a bed liner;
   a guide mechanism disposed between said bed liner and the bed, said guide mechanism coupled to the bed; and
   a rail assembly slidingly engaged with said guide mechanism, said rail assembly translatable from a stowed position to an operable position, the rail assembly detachably coupled to the swing gate by lock mechanism when the swing gate is in the open position and said rail assembly is in said operable position;
   the swing gate has an inner surface substantially parallel to the first sidewall when the swing gate is in the open position.

8. The cargo load support system of claim 7, wherein said rail assembly is positioned between said bed liner and the bed when said rail assembly is in said stowed position.

9. The cargo load support system of claim 7, wherein said rail assembly is substantially parallel to the bed when said rail assembly is in said operable position.

10. The cargo load support system of claim 7, wherein said rail assembly and said guide assembly are inset from an edge of the vehicle when each of said rail and guide assemblies are in said stowed positions to provide for sealing engagement between the swing gate and the vehicle.

11. The cargo load support system of claim 7, further including a bushing disposed between said rail assembly and said guide mechanism.

12. A cargo carrying vehicle comprising:
   a body including first and second side walls, a floor bed, a front wall and a swing gate, the first and second side walls, floor bed, front wall and swing gate defining a cargo bed, the swing gate mounted to one of the first and second side walls for pivoting about a vertical pivot axis; and
   a cargo load support system for increasing a load carrying capacity of the bed, the cargo load support system including an extending portion slidably coupled to the body for movement between a stored position and an operative position, the extending portion rearwardly extending beyond the floor bed and detachably coupled to the swing gate by a lock mechanism when in the operative position.

13. The cargo carrying vehicle of claim 12, wherein the lock mechanism includes at least one pivotal arm releasably attachable to the swing gate.

14. The cargo carrying vehicle of claim 13, wherein the lock mechanism further includes a pivotable lock bar interconnecting the extending portion and the swing gate when the extending portion is in the operative position.

15. The cargo carrying vehicle of claim 12, wherein the cargo load support system further includes a pair of support arms each pivotally attached to the extending portion for movement between a generally horizontal position and a generally vertical position, and a transverse member supported by said pair of support arms when the pair of support arms are in the generally vertical position.

16. The cargo carrying vehicle of claim 12, further comprising a bed liner interconnected to the body, the cargo load support system disposed between the floor bed and the bed liner.

17. A cargo load support system in combination with a vehicle having first and second spaced apart sidewalls, a bed and a swing gate articulable about a vertical axis from an open position to a closed position, the cargo load support system comprising:
   a guide mechanism including a first brace having a plurality of guide apertures, the first brace being substantially parallel to the swing gate when the swing gate is in the closed position, the brace coupled to the bed; and
   a rail assembly slidingly engaged with the guide mechanism, the rail assembly translatable from a stowed position to an operable position, the rail assembly detachably coupled to the swing gate by a lock mechanism when the swing gate is in the open position and the rail assembly is in the operable position.

18. The cargo load support system of claim 17, wherein the guide mechanism includes a second brace coupled to the bed, the second brace spaced apart from and substantially parallel to the first brace.

19. The cargo load support system of claim 18, wherein said second brace includes a plurality of apertures substantially aligned with the plurality of apertures of the first brace.

20. The cargo load support system of claim 17, wherein the first brace includes a channel having a top and a flange substantially parallel to each other, wherein the top is coupled to the bed and the flange is coupled to a bed liner thereby sandwiching the guide mechanism between the vehicle bed and the bed liner.

* * * * *